(12) United States Patent
Michael (10) Patent No.: US 10,464,177 B2
(45) Date of Patent: Nov. 5, 2019

(54) ADJUSTABLE DEPTH MAGNETIC DEVICE (71) Applicant: Creative Engineering Solutions, Inc., Parker, CO (US)

(72) Inventor: Jim G Michael, Parker, CO (US)

(73) Assignee: Creative Engineering Solutions, Inc., Parker, CO (US)

( * ) Notice: Subject to any disclaimer, the term of this patent is extended or adjusted under 35 U.S.C. 154(b) by 148 days.

(21) Appl. No.: 15/786,941

(22) Filed: Oct. 18, 2017

(65) Prior Publication Data
US 2018/0111237 A1 Apr. 26, 2018

Related U.S. Application Data (60) Provisional application No. 62/412,993, filed on Oct. 26, 2016.

(51) Int. Cl.
*B23Q 1/00* (2006.01)
*B23Q 3/154* (2006.01)
*B23Q 1/03* (2006.01)
*B25B 11/00* (2006.01)
*B25B 27/14* (2006.01)
*F16B 1/00* (2006.01)

(52) U.S. Cl.
CPC .............. *B23Q 3/154* (2013.01); *B23Q 1/032* (2013.01); *B25B 11/002* (2013.01); *B25B 27/14* (2013.01); *F16B 2001/0035* (2013.01)

(58) Field of Classification Search
CPC ... B25B 11/00; B25B 11/002; B25B 11/2714; B23Q 1/032
See application file for complete search history.

(56) References Cited

U.S. PATENT DOCUMENTS

| | | | |
|---|---|---|---|
| 7,012,495 B2 * | 3/2006 | Underwood | B23Q 3/1546 269/8 |
| 7,647,681 B1 * | 1/2010 | Harris | B23K 37/0408 29/281.1 |
| 2016/0184981 A1 * | 6/2016 | Kanda | B23Q 3/1546 269/8 |
| 2018/0111237 A1 * | 4/2018 | Michael | B25B 27/14 |

* cited by examiner

*Primary Examiner* — Lee D Wilson
(74) *Attorney, Agent, or Firm* — Christopher A. Taravella (57) ABSTRACT

An adjustable depth magnetic device comprises a switchable magnet, switchable magnet carrier, or switchable magnet integrated into a carrier, constrained by and locked into position by a receiver that is separate from or integrated into an object or fixture. The adjustable depth magnetic device may be affixed to or integrated into an object for the purpose of constraining said object to a ferrous target; or the adjustable depth magnetic device may be affixed to or integrated into a fixture to facilitate manufacturing, production, and/or assembly operations.

14 Claims, 11 Drawing Sheets

MagnaJig

MagnaJig – Exploded View

Figure 1b – MagnaJig - Sectioned

Figure 1a - MagnaJig

Figure 1c – MagnaJig – Exploded View

Figure 1d – MagnaJig Threaded DD shaped DPS Magnet or Threaded DD shaped DPS Magnet Carrier – Exploded View Figure 2 – Threaded MagnaJig Figure 3 – Threaded MagnaJig with Integrated Receiver Figure 4 – Threaded MagnaJig Figure 6 – Cam Clamp MagnaJig Figure 7 – Swivel Mount MagnaJig Figure 8a – MagnaJig Threaded DPS Magnet or Threaded DPS Magnet Carrier Figure 8b – MagnaJig Threaded DD shaped DPS Magnet or Threaded DD shaped DPS Magnet

ADJUSTABLE DEPTH MAGNETIC DEVICE

The benefit, including without limitation the benefit of the earlier filing date, of the earlier filed provisional application No. 62/412,993, filed Oct. 26, 2016, Adjustable Depth Magnetic Device, is claimed.

BACKGROUND OF THE INVENTION

The subject of this invention is an adjustable depth magnetic device consisting of a switchable magnet, switchable magnet carrier, or switchable magnet integrated into a carrier (collectively "MagnaJig") and a receiver, wherein the MagnaJig is constrained to a receiver. The adjustable depth magnetic device may be affixed to or integrated into an object to constrain said object to a ferrous target; alternatively, the adjustable depth magnetic device may be affixed to or integrated into a fixture to aid in manufacturing, production, and/or assembly operations.

FIELD OF THE INVENTION

There is need for a device that can accurately constrain ferrous material from a single side in a desired position or orientation. The device is ideally capable of aiding rapid and economical assembly for virtually any size or shape of material.

At present, most fixtures use a clamping device to squeeze material against a fixed stop. Most current methods require access to both the inside and outside surface of the material. As access to both sides of the material is not often readily available, costly and complex fixtures are necessary. Other current methods that use single-sided clamping techniques such as vacuum, temporary adhesion (welding or gluing), and other magnetic attachment often require considerable expense, effort and supporting equipment to process.

Description of Related Art

U.S. Pat. No. 7,055,679B2 issued to Shen and Lin (2003), the Reconfigurable Magnetic Fixturing Pallets for an Assembly Line ("the 679 patent"), describes a reconfigurable pallet that supports a structure. As recited in the '679 patent, "[t]he reconfigurable pallet includes a base and a modular stanchion. The modular stanchion is magnetically attachable to the base along x and y axes" relative to a top surface of the base. "The modular stanchion includes a support element that has a height along a z axis that is transverse to the x and y axes. The support element supports the structure."

The '679 patent' relies on gravity to constrain the structure in position against the adjustable height stanchions. The stanchions are located onto a pallet base and held in place using a magnetic attachment system. While the adjustable height stanchions do offer support to the material placed on them, there is no positive attachment to the structure, thereby severely limiting the ability to hold the constrained structure.

U.S. Pat. No. 7,744,051B2 issued to Joyce, Kisner, & Hazzard (2005), Magnetic Attachment Element ("the '051 patent"), describes "a magnetic attachment element for use in connection with a pegboard having a plurality of pegboard orifices extending through a pegboard body. The magnetic element includes an attachment element body with at least one magnet in operational communication therewith for generating a magnetic force therefrom. The magnetic attachment element also includes at least one connector portion in operational communication with the attachment element in the element body for attaching the attachment element body to the pegboard by engaging the one or more connector portions to one or more of the pegboard orifices. Methods of manufacturing the magnetic attachment element are also disclosed."

The '051 patent provides a method for locating multiple magnetic attachment points in various configurable locations. However, it does not have the ability to vary the magnet height except in fixed increments. Its primary application is to attach to ferrous tools such as sockets and wrenches. It does not disclose use of switchable magnets.

U.S. Pat. No. 4,837,540 A issued to Cardone Michele, Grandini Angelo, Zaramella Bruno, (1989), Magnetic Work-Holder, ("the '540 patent"), describes a "magnetic holding device, comprising magnetically activable holding surface having pole members of different polarities, and at least a first and a second single-pole extension members for said pole members of opposite polarities. Each pole-extension member comprises a base portion fastened to a pole member and a movable portion sliding on said base portion along an inclined surface the sliding surfaces of said first and second pole-extension members are slanted in opposite angular directions in respect to said holding surface of the device."

The '540 patent uses a magnetic chuck or base that contains multiple magnetic poles. Single pole extensions divert the magnetic flux within a magnetic pole in the chuck base. The use of multiple pole extensions allows the magnetic flux to travel from one adjustable pole extension to another. Each pole extension is comprised of a fixed pole portion and a moveable pole portion which slides on an inclined plane to the desired height.

The '540 patent discloses a considerably large (heavy and costly) multi-pole magnetic chuck to activate the pole extensions. The design limits the application of the invention to items that can fit within the prescribed footprint of the magnetic chuck base. In addition, as the variation in distance between poles increases, the magnetic flux intensity decreases due to an increase in pole extension mass as well as an increase in distance between magnetic poles. Thus, the holding force of the fixture is substantially reduced—in some cases to the point of rendering the invention useless.

Thus there remains a need for a device that can provide a single-sided magnetic attachment that can be readily assembled or integrated into a wide range of fixture sizes and shapes at an economical price.

BRIEF SUMMARY OF THE INVENTION

This invention is comprised of two primary components: a MagnaJig and a receiver into which the MagnaJig fits. The receiver is a device that may be attached to a fixture designed to constrain the MagnaJig. The receiver permits limited motion of the magnetic face of the MagnaJig and provides the ability to lock the MagnaJig at a desired position relative to the fixture. Although the MagnaJig is typically perpendicular to the receiver, the receiver may be allowed to pivot, offering additional degrees of freedom for the receiver relative to the fixture.

There are several variants of switchable electrical, permanent and hybrid magnets currently on the market available in a wide variety of sizes and shapes. While all of these magnet variations may be used with this invention, a preferred embodiment incorporates the current highest performance to weight ratio switchable magnets available. These magnets are "phase cancelling" magnets rather than outdated "shunting" or electro-magnet low performance technologies. Some of the preferred embodiments depicted in this invention use the Rotary Switchable Multi-Core Element Permanent Magnet-Based Apparatus described in U.S. Pat. No. 8,350,663 B1 by inventor Michael (2011) ("the '663 patent"), integrated into a carrier. The '663 patent not only uses 'phase cancelling' magnetic techniques but also incorporates a unique multi-pole technology. The multi-core element technology typically has four or more magnetic poles integrated into a single switchable magnet and offers a substantial increase in performance over dual-pole switchable phase cancelling magnets, hereinafter referred to as "DPS Magnets". Two such examples of DPS Magnets are described in U.S. Pat. No. 7,012,495B2 Switchable Permanent Magnetic Device by inventors Underwood and Kocijan (1999) ("the 495 patent") as well as U.S. Pat. No. 4,055,824A Switchable Permanent Magnetic Holding Devices by inventor Baermann (1977) ("the 824 patent").

The '495 patent describes a switchable magnetic device that includes a first magnet and a second magnet that are cylindrical. The magnets are housed in a housing comprised of two ferromagnetic pole pieces. The lower magnet is affixed to the housing, while the upper magnet is allowed to rotate inside the housing thereby activating or deactivating the magnetic device. Like most switchable permanent magnetic devices, rotation limiting features and/or locking mechanisms are used to restrain the upper magnet from rotation in the actuated position. This magnetic device is an example of dated dual pole switchable phase cancelling magnet technology. Nevertheless, DPS Magnets can be adapted to function adequately in some limited applications. In the '495 patent adaptation, the DPS Magnet housing is comprised of two ferromagnetic poles integrated into a single housing that is also a carrier. The two ferromagnetic pole pieces are incorporated into a carrier housing which functions similarly to the MagnaJig of the instant invention. The primary difference between application of the MagnaJig and DPS Magnet technology is that the MagnaJig may use a separate carrier and a multi-pole switchable permanent magnet while the DPS Magnet combines the two ferromagnetic pole pieces and two magnets into a single ferromagnetic carrier. In most cases it is beneficial to make use of magnets that have a minimal distance between magnetic poles. One of those benefits is avoiding magnetic flux oversaturation of the material. Excess magnetic flux (magnetic flux not absorbed by the ferrous material in the immediate vicinity of the magnet) is often detrimental to the manufacturing process. As an example, excess magnetic flux often hampers the ability to weld by interfering with the electric arc created in the arc welding process. Moreover, excess magnetic flux also attracts loose ferrous particles. Excess magnetic flux may indicate that the magnet is improperly sized for the application and therefore larger, heavier, more cumbersome, and more costly than necessary. For a more detailed explanation of multi-pole phase cancelling switchable permanent magnets, please refer to the '663 patent.

The advent of highly efficient switchable permanent magnets, such as those described in the '663 patent, allows for fixturing techniques not previously practical. As an example, a switchable permanent magnet of the design described in the '663 patent having a diameter of 1¾" inches and height of ¾" tall can exceed 200 pounds of holding force on 0.2" thick steel.

Integrating the high performance, multi-polar phase cancelling magnets into a special carrier produces a preferred embodiment of the Adjustable Depth Magnetic Device. The receiver, as described earlier, contains a positioning means. The positioning means describes a method of accurately locating and locking the MagnaJig relative to the receiver or fixture. Receivers may include, for example and not by way of limitation, a variety of external features such as:

Complementary threaded shafts and jam nuts;
The fixture itself with complementary threads integrated therein;
Slip shafts with compression fittings;
Slip shafts with cam lock fittings;
Complementary threaded shaft mounted to a swivel receiver;
Rack and pinion shafts; and
Worm drive shafts.

The MagnaJig, through a variety of different positioning means, is capable of rapid, accurate positioning relative to the receiver. All or portions of the receiver may be attached, affixed, incorporated or otherwise integrated into a wide variety of fixtures or objects using a mechanical attachment means. Mechanical attachment means may include, for example and not by way of limitation, positional constraint, welding, adhesives, screws, and rivets. Alternatively, the receiver may be integrated into the fixture itself.

The fixture to which all or portions of the receiver is attached, affixed, incorporated, or otherwise integrated into may be, by way of example and without limitation, a template for guiding manufacturing equipment such as saws, grinders, routers, plasma cutters, or welders. The fixture also may be used in alignment fixtures to position materials with respect to each other, such materials being fastened or welded together. Fixtures also may be used as temporary setting patterns, holding ferrous material for work to be performed thereon.

The object to which all or portions of the receiver is attached, constrained, affixed, incorporated or otherwise integrated into may be, by way of example and without limitation, any device that one may want to temporarily attach to a ferrous material such as robotic end effectors, mounting bases for lighting, cameras, mounting bases for measurement, rails, guides, or other such devices that would benefit from being attached to ferrous materials.

In one preferred embodiment, the exterior of the MagnaJig is threaded using standard or acme thread. The receiver in this embodiment is a complementary threaded component similar to a flange nut. The receiver is attached to a fixture using mechanical attachment means. Rotation of the MagnaJig relative to the affixed receiver moves the position of the contact surface of the MagnaJig. Once in position, a jam nut is tightened against the receiver surface effectively locking the MagnaJig in the desired position.

In another preferred embodiment, the exterior of the MagnaJig is threaded using standard or acme thread. The receiver in this embodiment is a complementary threaded component similar to a flange nut. Rotation of the MagnaJig relative to the optionally attached receiver moves the position of the contact surface of the MagnaJig through the fixture into contact with the target. Activating the MagnaJig constrains the fixture to the target by attaching the MagnaJig to the target which squeezes the bottom of the receiver against the top of the fixture surface, effectively locking the MagnaJig in the desired position.

In another preferred embodiment, the exterior of the MagnaJig is threaded using standard or acme thread. The fixture in this embodiment, has all or portions of the receiver integrated into the fixture, hereinafter referred to as an integrated receiver. The integrated receiver not only eliminates the need for a separate receiver, but also eliminates the need to affix a separate receiver to the fixture. Rotation of the MagnaJig relative to the integrated receiver moves the position of the contact surface of the MagnaJig. Once in position, a jam nut is tightened against the integrated receiver surface effectively locking the MagnaJig in the desired position.

In another preferred embodiment, the exterior of the MagnaJig is threaded using standard or acme thread. The receiver in this embodiment is a complementary threaded component similar to a flange nut. The receiver is placed on the bottom surface of the fixture or template that has a hole cut into it, allowing the MagnaJig to slip through. Rotation of the MagnaJig relative to the receiver placed on the bottom of the fixture adjusts the relative position of the contact surface of the MagnaJig to the fixture. Once in position, a jam nut or an additional receiver is tightened against the top surface of the fixture, effectively locking the MagnaJig in the desired position.

In another preferred embodiment, the exterior of the MagnaJig is a smooth cylindrical wall or slip shaft, or DD shaped body. The receiver is flange-shaped with an interior sleeve and exterior thread, a compressive component such as a ferrule or like device such as without limitation, "O Ring" or compression washer, and a compression nut. The receiver is attached to the fixture using mechanical attachment means. The MagnaJig is slipped into the receiver and located at the desired height. Tightening of the compression nut relative to the exterior thread squeezes the compressive component against the MagnaJig, effectively locking the MagnaJig in the desired position.

In another preferred embodiment, the exterior of the MagnaJig is a smooth cylindrical wall, slip shaft, or DD shaped body. The receiver is flange-shaped with an interior split walled sleeve and a cam-actuated band clamp. The receiver is attached to the fixture using mechanical attachment means. The MagnaJig is slipped into the receiver and located at the desired height. Rotation of the band clamp causes the split walled sleeve of the band clamp to squeeze against the MagnaJig, effectively locking the MagnaJig in the desired position.

In another preferred embodiment, the exterior of the MagnaJig is threaded using standard or acme thread. The receiver in this embodiment is a swivel mount with the complementary threaded component machined directly into the swivel mount, hereinafter referred to as a swivel receiver. The swivel receiver not only eliminates the need for a separate receiver, but also provides features necessary to affix it to the fixture. Rotation of the MagnaJig relative to the swivel receiver moves the position of the contact surface of the MagnaJig. Once in position, a jam nut or similar binding device is tightened against the swivel receiver surface effectively locking the MagnaJig at the desired height while allowing the magnetic surface of the MagnaJig to swivel to the optimal position towards an angled target.

As receivers may be substantially lower in cost than MagnaJigs, they could be consumable components. This would allow them to be incorporated into a multitude of fixtures. MagnaJigs can then be transferred from one fixture to another, reducing fixturing costs. The figures referenced have depicted a few of many different examples of DPS Magnets that are readily adjustable to accommodate a wide range of fixturing needs.

BRIEF DESCRIPTION OF THE SEVERAL VIEWS OF THE DRAWINGS

FIG. 1b shows a sectioned view of the MagnaJig depicted in FIG. 1a.

FIG. 1c shows an exploded view of the MagnaJig depicted in FIG. 1a.

DETAILED DESCRIPTION OF THE INVENTION

Figure 1A:
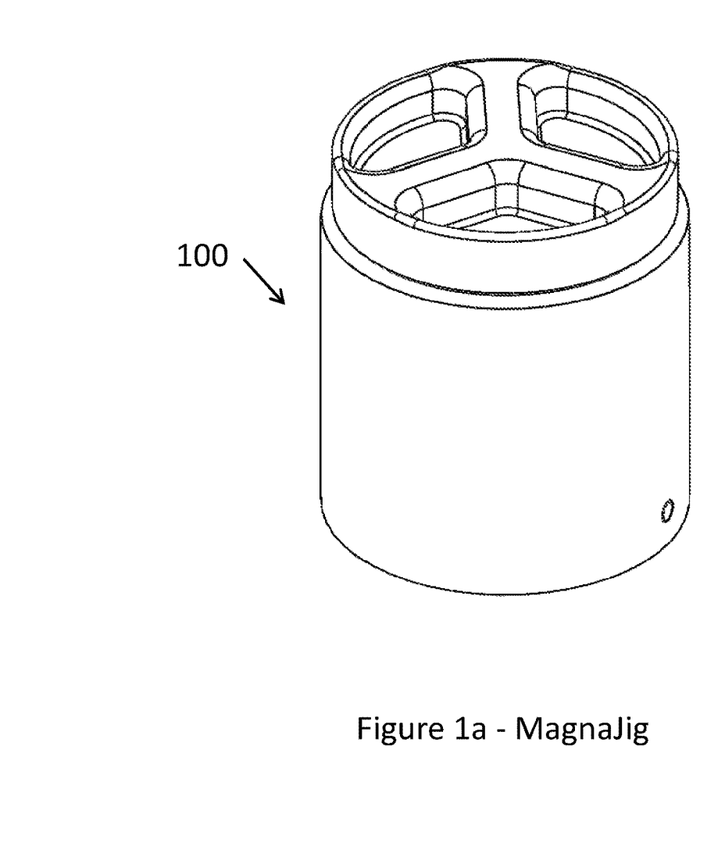
FIG. 1a shows a MagnaJig.
Figure 1B:
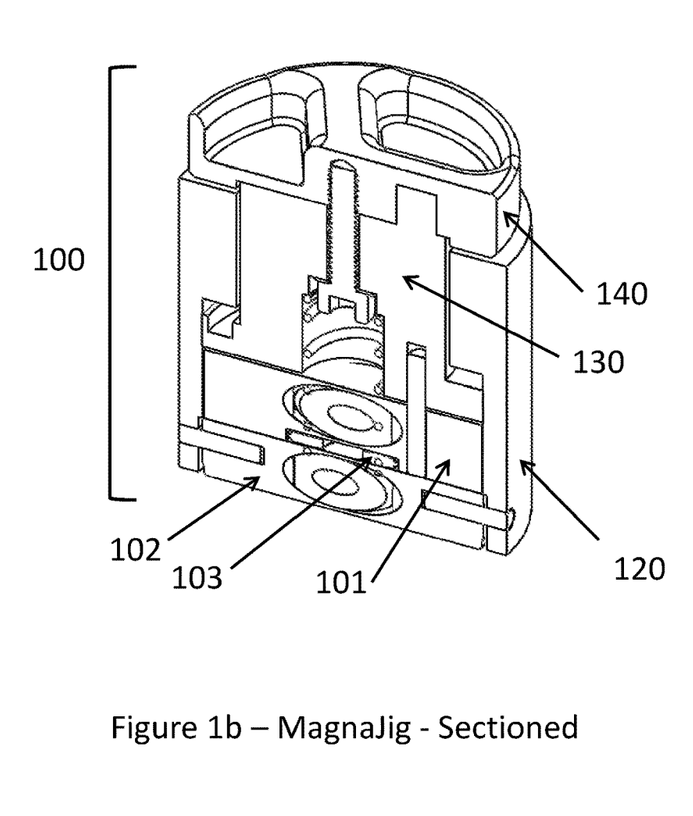
Figure 1C:
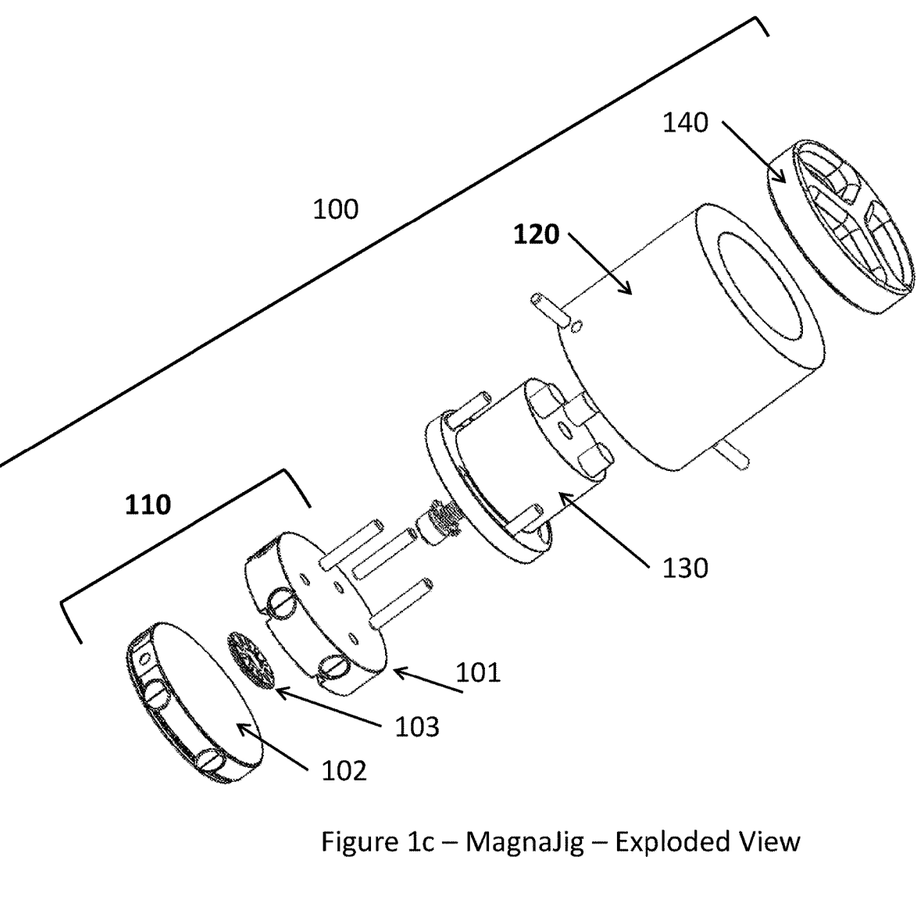

FIGS. 1a, 1b and, 1c show a basic MagnaJig 100 comprised of an external sleeve 120 containing a switchable multi-core element magnet 110 containing an upper carrier platter 101, lower carrier plater 102, bearing 103, rotation lever 140, rotation limiter 130, and an optional rotation lock mechanism (not shown). The rotation lever 140 is affixed to the rotation limiter 130, which is linked to the upper carrier platter 101. The lower carrier platter 102 is affixed to sleeve 120. Rotation of the rotation lever 140 causes a relative rotation of the upper carrier platter 101 with respect to the affixed lower carrier platter 102. Alignment or dis-alignment of the magnetic poles located in the switchable multi-core element 110 activates or de-activates the device.

Figure 1D:
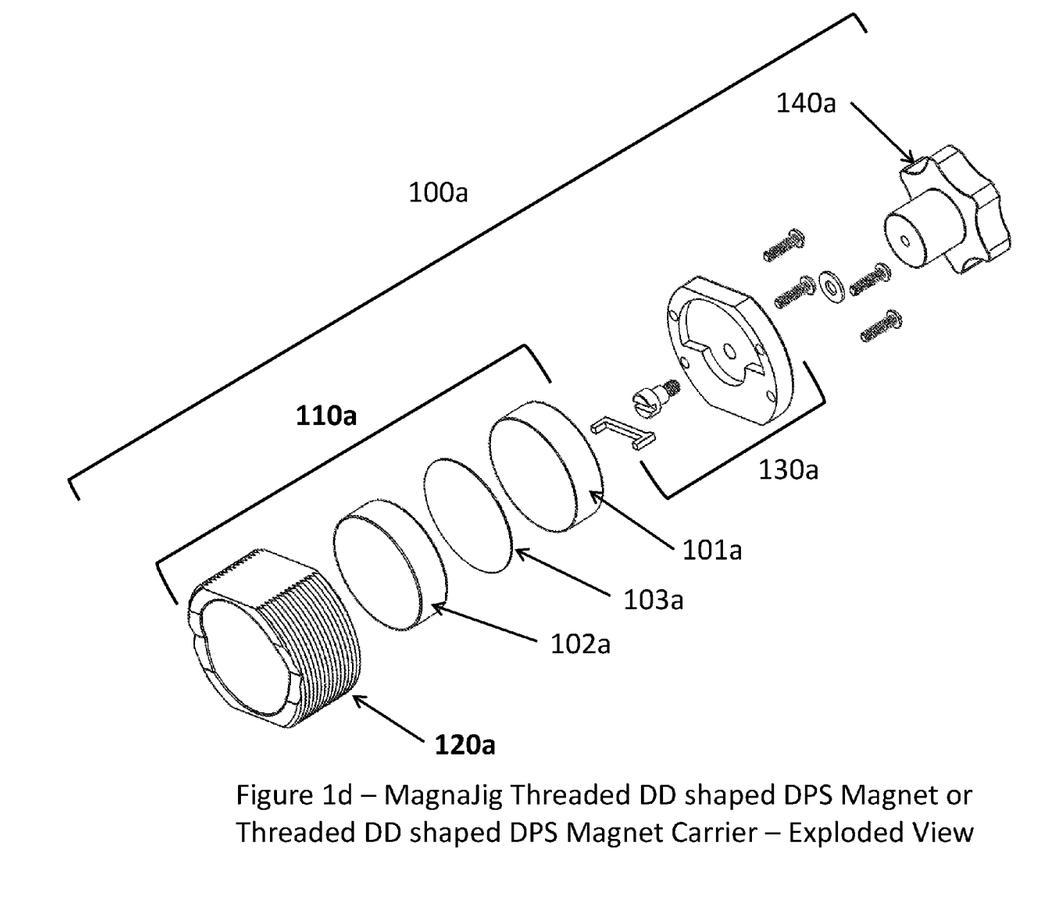
FIG. 1d shows an exploded view of a MagnaJig employing a DD Shaped DPS Magnet or DD Shaped DPS Magnet Carrier.

FIG. 1d shows an externally threaded MagnaJig employing a DD shaped DPS Magnet or DD shaped DPS Magnet Carrier 100a comprised of an external sleeve 120a with two integrated magnetic poles, upper rotatable magnet 101a, lower affixed magnet 102a, bearing 103a, rotation knob 140a, rotation limiter 130a and an optional rotation lock mechanism (not shown). The rotation knob 140a is affixed to the rotation limiter 130a, which is linked to the upper rotatable magnet 101a. The lower magnet 102a is affixed to sleeve 120a. Rotation of the rotation knob 140a causes a relative rotation of the upper magnet 101a with respect to the affixed lower magnet 102a. Alignment or dis-alignment of the magnetic poles located in the switchable magnetic device 110a activates or de-activates the MagnaJig 100a. The DD shaped DPS Magnet or DD shaped DPS Magnet Carrier 100a need not be threaded. For more information on how Dual Pole Switchable Magnets operate, please refer to the '495 patent.

Figure 2:
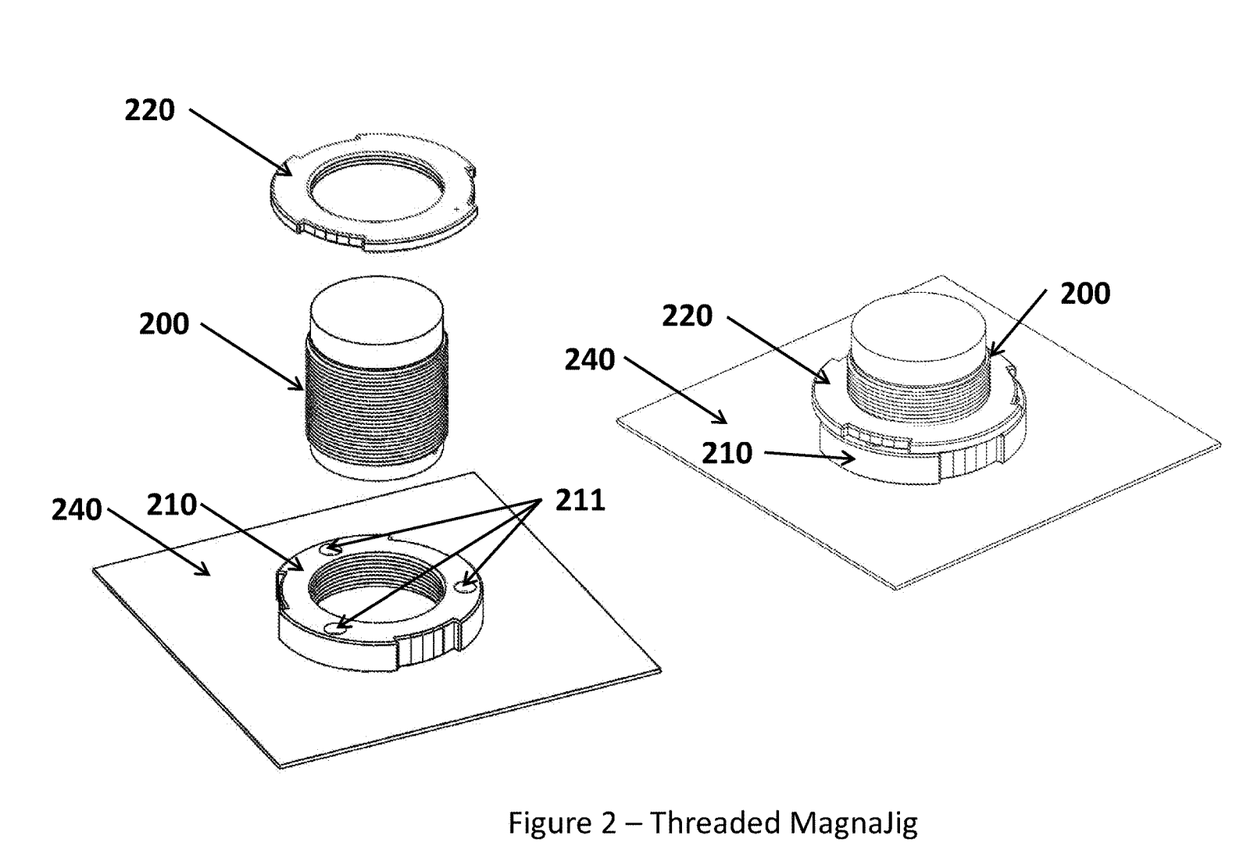
FIG. 2 shows an externally threaded MagnaJig and receiver in an exploded view and assembled view.

FIG. 2 shows an externally threaded MagnaJig 200, a receiver 210, locknut 220 attached to fixture 240 aligned with a clearance hole. Receiver 210 may be attached to fixture 240 by mounting holes 211 or other mechanical attachment means. Receiver 210 may or may not be secured to fixture 240. MagnaJig 200 can be threaded into receiver 210 so that it is flush to the bottom of the fixture 240 or set at a desired depth. Locknut 220 is threaded onto MagnaJig 200, tightened against receiver 210, securing it at the desired depth. Alternatively, a second receiver 210 may be used in lieu of the thinner locknut 220, space permitting.

Figure 3:
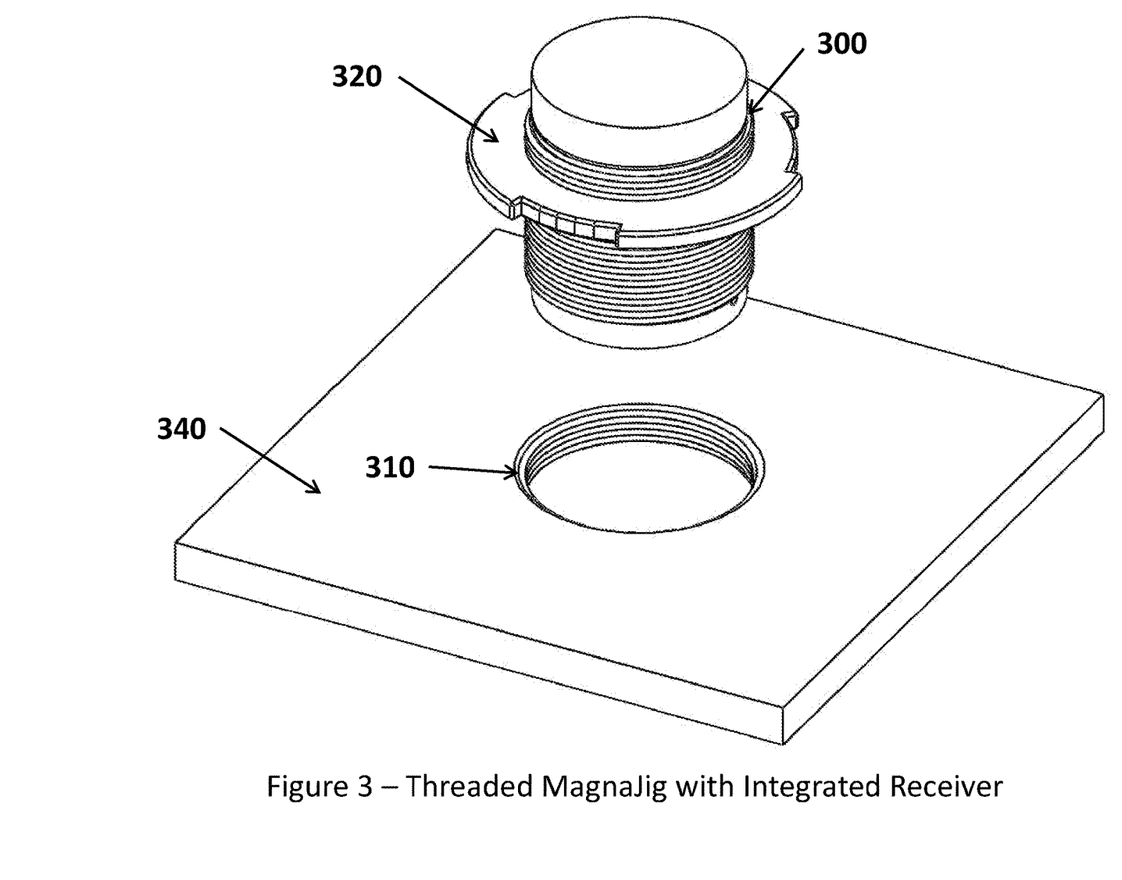
FIG. 3 shows a partially exploded view of an externally threaded MagnaJig and receiver integrated into a fixture.

FIG. 3 shows an externally threaded MagnaJig 300 with receiver 310 integrated into fixture 340. Mating machining threads are made directly into fixture 340. MagnaJig 300 is threaded into integrated receiver 310 so that it is flush to the bottom of the fixture 340 or set at a desired depth. Locknut 320 is threaded onto MagnaJig 300, tightened against fixture 340, securing it at the desired depth. This embodiment depicted in this figure eliminates the need for a separate receiver.

Figure 4:
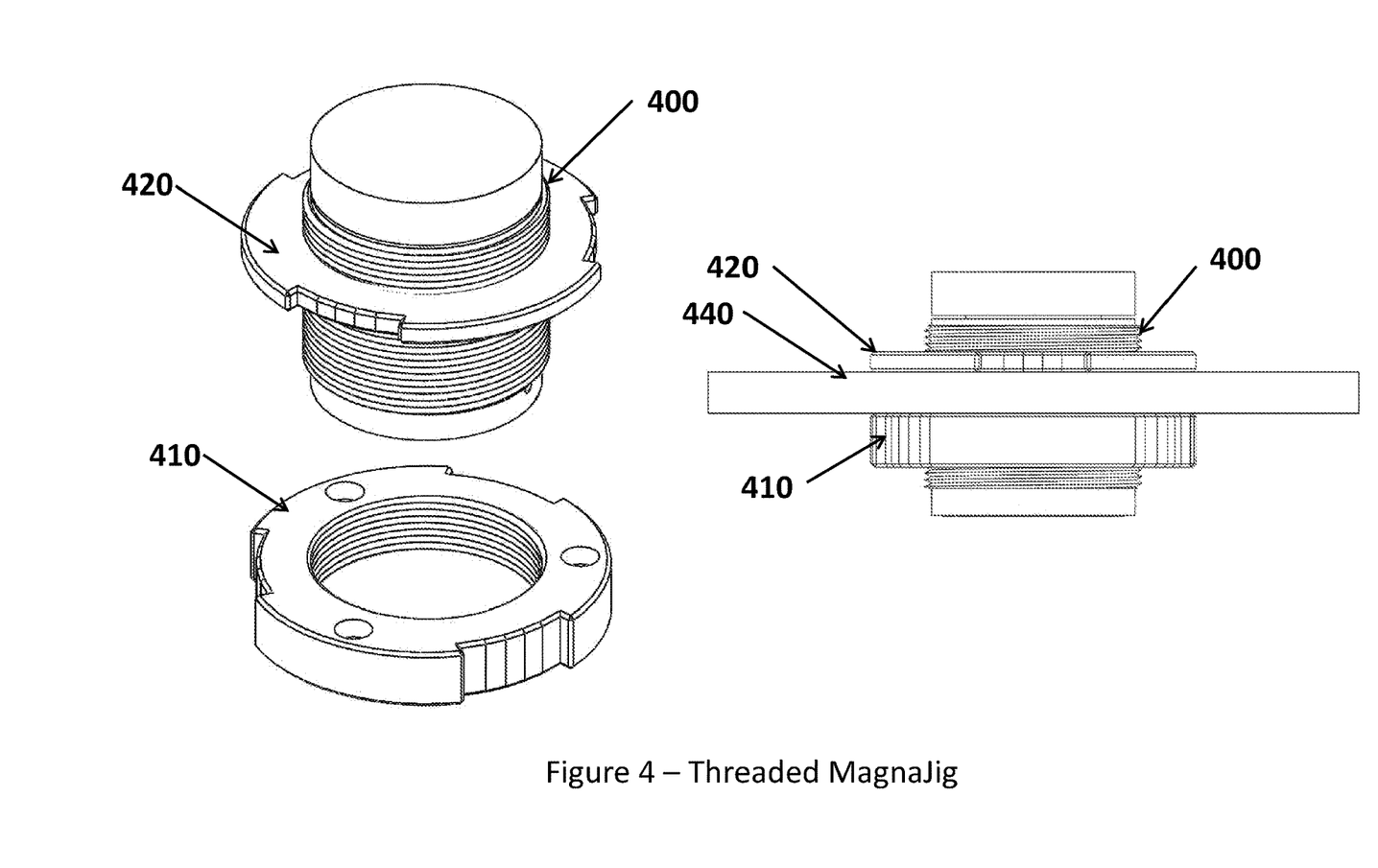
FIG. 4 shows a partially exploded and assembled view of an externally threaded MagnaJig with top locknut and bottom receiver constrained to a fixture having a clearance hole.

FIG. 4 shows an externally threaded MagnaJig 400, a receiver 410, locknut 420, and fixture 440. Fixture 440 contains a clearance hole (not shown) larger than the diameter of the MagnaJig 400 and smaller than the diameter of the receiver 410. MagnaJig 400 is threaded into receiver 410, which is aligned with the clearance hole and placed on one side of fixture 440 and locknut 420 is threaded onto the MagnaJig from the opposite side of fixture 420. The MagnaJig is positioned relative to the fixture 440 at the desired height and locknut 420 is tightened against fixture 440, securing it at the desired depth. In this example, receiver 410 or locknut 420 may be swapped or used in lieu of either another receiver or locknut. Receiver 410 may or may not be affixed to fixture 440.

Figure 5:
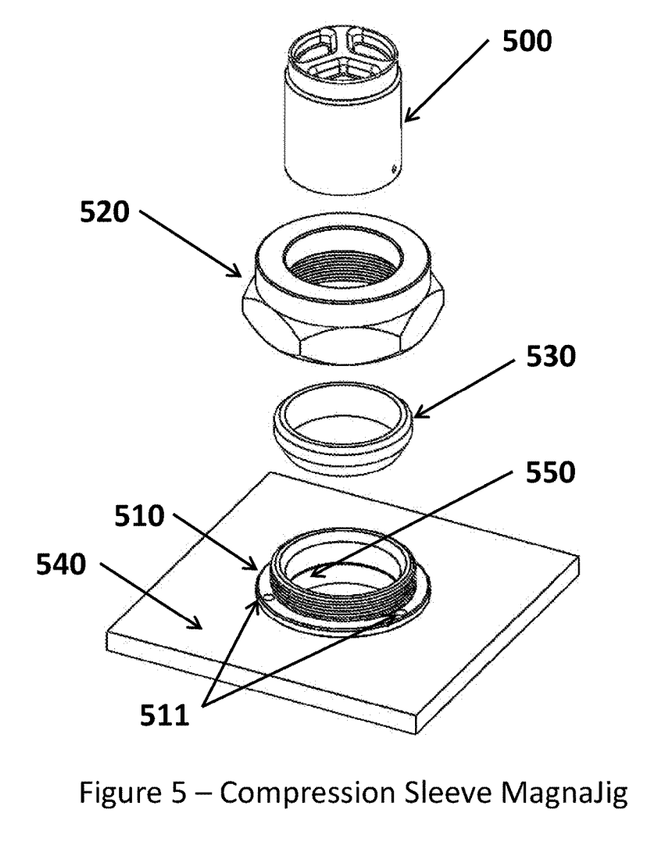
FIG. 5 shows an exploded view of a slip shaft version of the MagnaJig, a compression style locknut, compression ferrule and compression style receiver attached to a fixture with a clearance hole.

FIG. 5 shows a slip shaft version of the MagnaJig 500, a receiver 510, locknut 520, and compression ferrule 530 attached to fixture 540 through a clearance hole. Receiver 510 may or may not be attached by mounting holes 511, or other mechanical attachment means, to fixture 540 aligned with the clearance hole 550. MagnaJig 500 is inserted into receiver 510 at the desired depth. Locknut 520 is threaded onto MagnaJig 500, with compression ferrule 530 in between and as locknut 520 is tightened, compression ferrule 530 constricts around MagnaJig 500, securing the MagnaJig at the desired depth.

Figure 6:
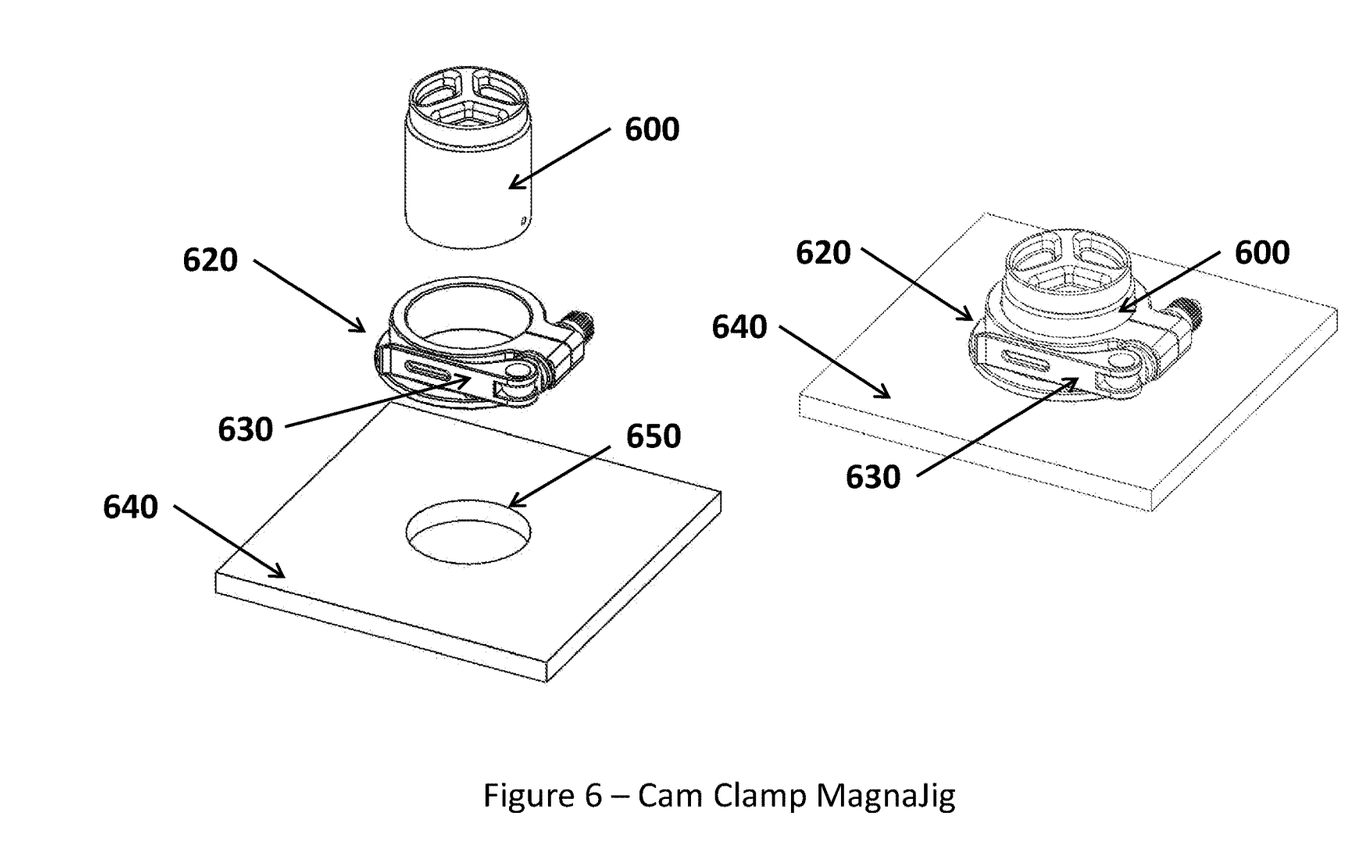
FIG. 6 shows an exploded and assembled view of a slip shaft version of the MagnaJig, a cam clamp style locknut attached to a fixture with a clearance hole.

FIG. 6 shows a slip shaft version of the MagnaJig 600 and receiver 620 with integrated cam clamp 630, which may or may not be attached to fixture 640 through a clearance hole 650. MagnaJig 600 is inserted into receiver 620 at the desired depth, and cam clamp 630 is pivoted to the tightened position, securing the MagnaJig 600 at the desired depth.

Figure 7:
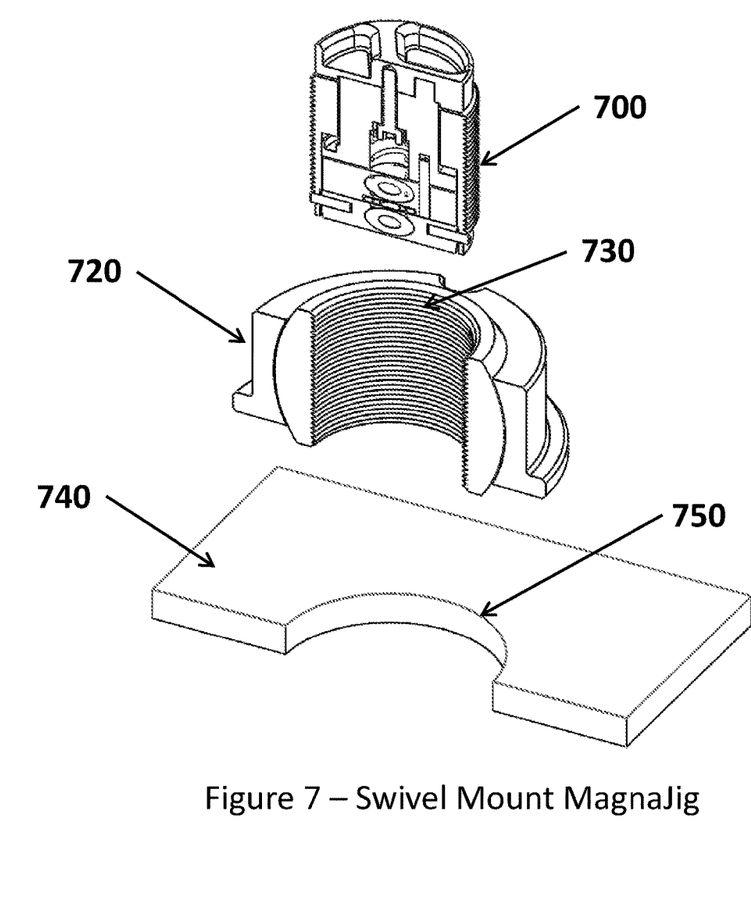
FIG. 7 shows an exploded and sectioned view of a threaded version of the MagnaJig, a swivel receiver, and fixture.

FIG. 7 shows a sectioned and exploded view of a MagnaJig 700, a swivel receiver 720, having complementary threads 730 to the MagnaJig 700, and fixture 740 aligned with a clearance hole 750. Receiver 720 may be attached to fixture 740 using mechanical attachment means. MagnaJig 700 is threaded into receiver 720 at a desired depth and held in place using positioning means. Positioning means to secure MagnaJig 700 in this embodiment may be a temporary thread adhesive or friction element, or as described above, a locknut or jam nut (not shown) tightened against receiver 720, securing the MagnaJig at the desired depth while allowing the MagnaJig angular and or rotational movement relative to the fixture.

Figure 8A:
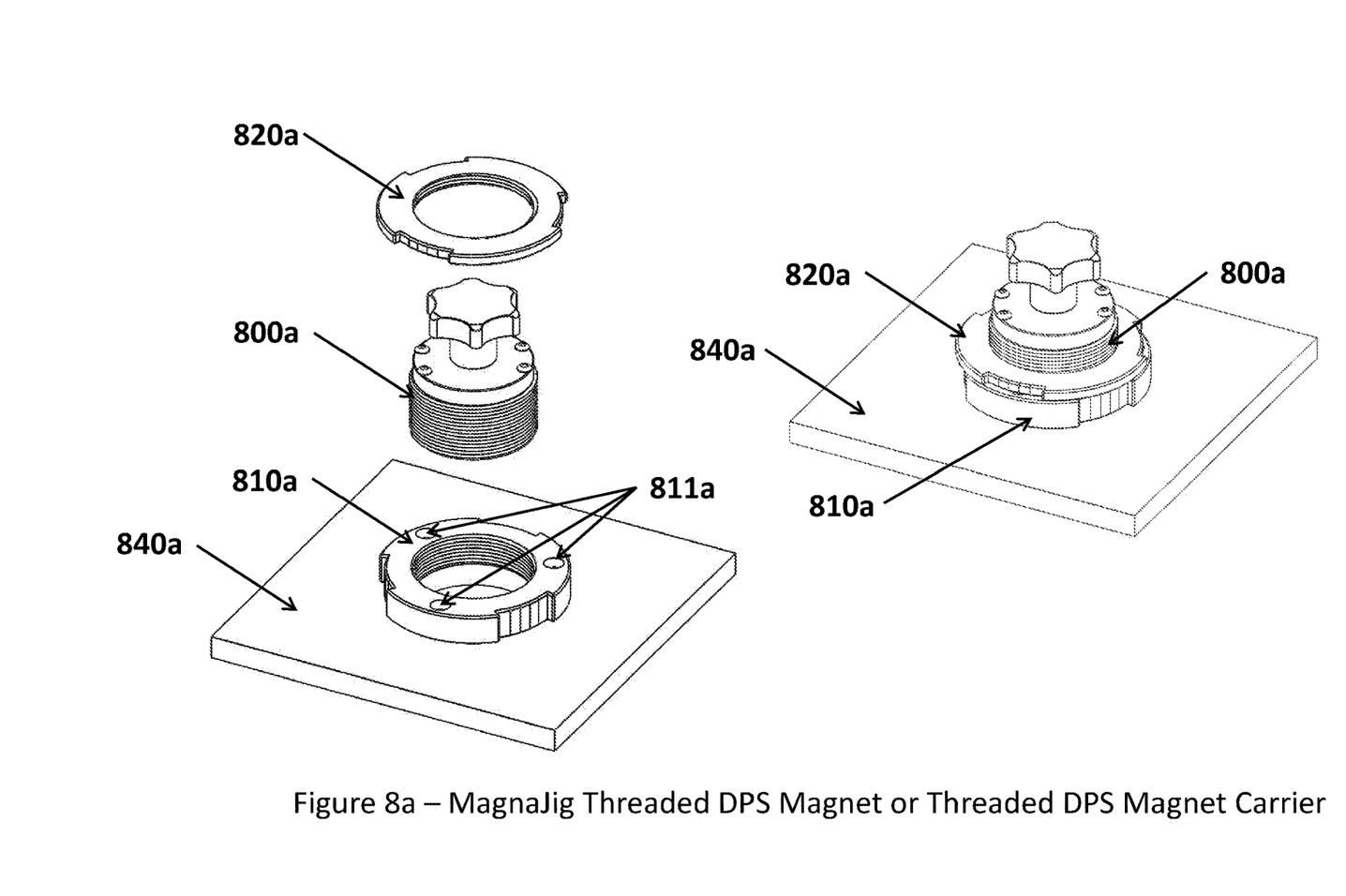
FIG. 8a shows an exploded view of a MagnaJig Threaded DPS Magnet or MagnaJig Threaded DPS Magnet Carrier and receiver in an exploded view and assembled view.

FIG. 8a shows an externally threaded MagnaJig DPS Magnet or DPS Magnet Carrier (MagnaJig) 800a, a receiver 810a, locknut 820a attached to fixture 840a aligned with a clearance hole. Receiver 810a may be attached to fixture 840a by mounting holes 811a or other mechanical attachment means. MagnaJig 800a can be threaded into receiver 810a so that it is flush to the bottom of the fixture 840a or set at a desired depth. Locknut 820a is threaded onto the MagnaJig 800a, tightened against receiver 810a, securing it at the desired depth. Alternatively, a second receiver 810a may be used in lieu of the thinner locknut 820a, space permitting. MagnaJig 800a need not be threaded and can be used as depicted in other figures.

Figure 8B:
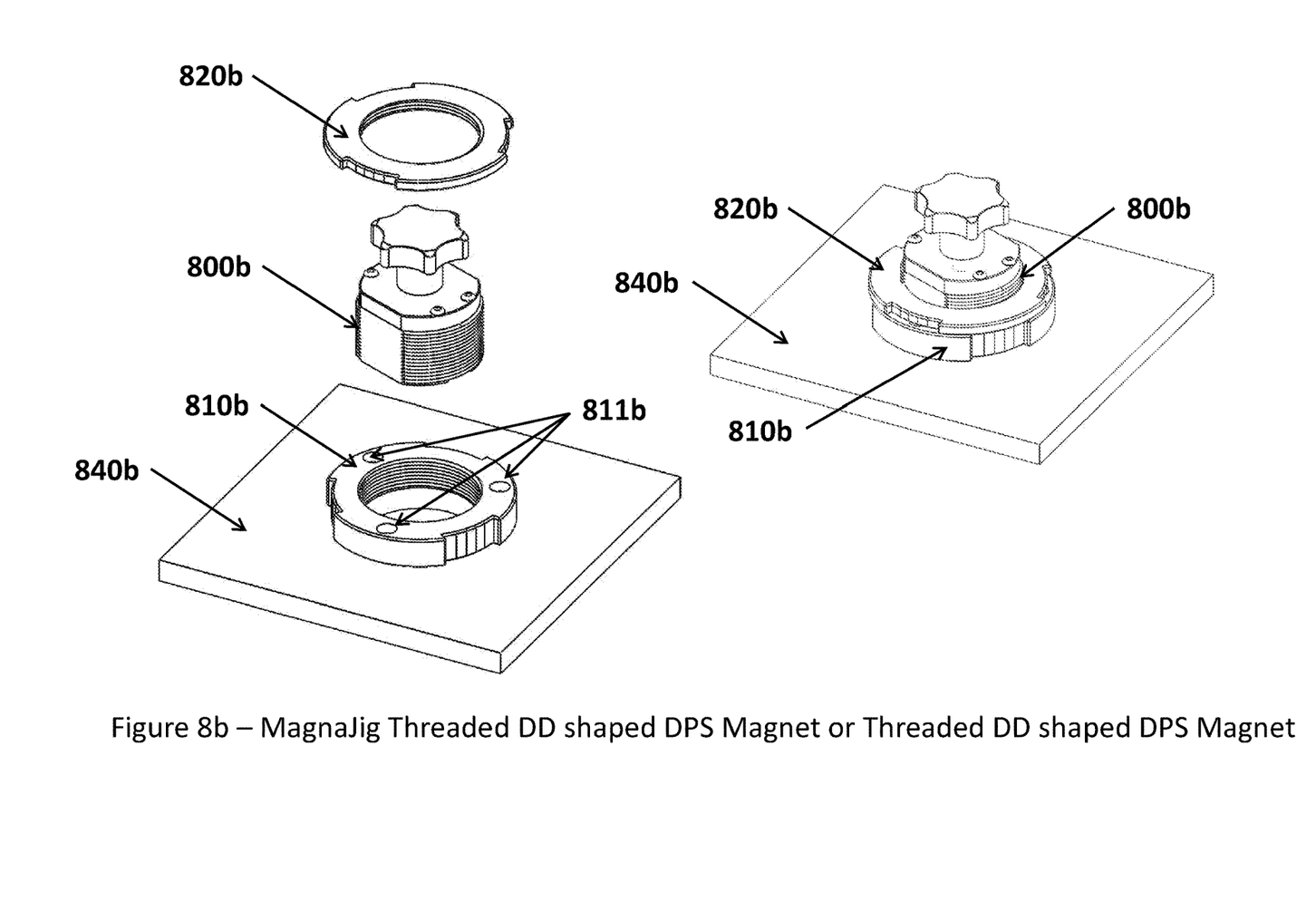
FIG. 8b shows an exploded view of a MagnaJig Threaded DD shaped DPS Magnet or Threaded DD shaped DPS Magnet Carrier, also known as "Double D shaped," and receiver in an exploded view and assembled view.

FIG. 8b shows an externally threaded MagnaJig DD shaped DPS Magnet or DD shaped DPS Magnet Carrier (MagnaJig) 800b, a receiver 810b, locknut 820b attached to fixture 840b aligned with a clearance hole. Receiver 810b may be attached to fixture 840b by mounting holes 811b or other mechanical attachment means. MagnaJig 800b can be threaded into receiver 810b so that it is flush to the bottom of the fixture 840b or set at a desired depth. Locknut 820b is threaded onto the MagnaJig 800b, tightened against receiver 810b, securing it at the desired depth. Alternatively, an additional receiver 810b may be used in lieu of the thinner locknut 820b, space permitting. Receiver 810b may be integrated into fixture 840b by machining the mating threads directly into fixture 840b. MagnaJig 800b need not be threaded and can be used as depicted in other figures.

The preferred embodiments described herein are merely illustrative and not exclusive, it being understood that one skilled in the art may deviate from one or more of the described preferred embodiments but still practice the instant invention.

What is claimed is:

1. An adjustable depth magnetic device comprising:
    a switchable magnet assembly which houses a switchable magnet with a magnetic face, that fits and moves within a receiver,
    means for positioning which constrain the movement of the switchable magnet assembly to a desired position relative to the receiver,
    wherein said means for positioning locate and lock the switchable magnet assembly to the receiver,
    wherein said receiver is constrained by means for mechanical attachment to an object thereby allowing the magnetic face of the switchable magnet to direct magnetic flux to a target.

2. The adjustable depth magnetic device of claim 1, wherein the means for positioning are comprised of a switchable magnet threaded on its exterior, which switchable magnet threads into the receiver, which also is threaded and affixed to the object, whereby a threaded tertiary component is threaded onto the exterior of the switchable magnet to cause binding of the switchable magnet against the receiver or the surface of the object, thereby locking the switchable magnet assembly relative to the object.

3. The adjustable depth magnetic device of claim 1, wherein the means for positioning are comprised of a switchable magnet threaded on its exterior, which switchable magnet threads into the receiver, which also is threaded and affixed to the object, whereby a thread-locking component is added to either the switchable magnet threads or to the threaded receiver to cause binding of the switchable magnet against the receiver or the surface of the object, thereby locking the switchable magnet assembly relative to the object.

4. The adjustable depth magnetic device of claim 1, wherein the switchable magnet is actuated manually.

5. The adjustable depth magnetic device of claim 1, wherein the switchable magnet is actuated electrically.

6. The adjustable depth magnetic device of claim 1, wherein the switchable magnet is actuated hydraulically.

7. The adjustable depth magnetic device of claim 1, wherein the switchable magnet is actuated pneumatically.

8. An adjustable depth magnetic device comprising:
   a switchable magnet assembly, which houses a switchable magnet with a magnetic face, threaded on its exterior that fits into and moves within an object having complementary threads;
   means for positioning which constrain the movement of the switchable magnet assembly to a desired position relative to the object;
   thereby allowing the magnetic face of the switchable magnet to direct the magnetic flux to a target;
   whereby a threaded tertiary component is threaded onto the switchable magnet exterior to cause binding of the switchable magnet against the surface of the object, thereby locking the switchable magnet relative to the fixture.

9. The adjustable depth magnetic device of claim 8, wherein the means for positioning comprise a thread-locking component added to either the switchable magnet threads or the threaded object to cause binding of the switchable magnet against the object, thereby locking the switchable magnet relative to the object.

10. The adjustable depth magnetic device of claim 8, wherein the means for positioning comprise a switchable magnet threaded on its exterior, which switchable magnet threads into a threaded swivel receiver, whereby the means for positioning constrain the switchable magnet to the object, said switchable magnet is capable of swiveling relative to the object to which is constrained.

11. The adjustable depth magnetic device of claim 8, wherein the switchable magnet is actuated manually.

12. The adjustable depth magnetic device of claim 8, wherein the switchable magnet is actuated electrically.

13. The adjustable depth magnetic device of claim 8, wherein the switchable magnet is actuated hydraulically.

14. The adjustable depth magnetic device of claim 8, wherein the switchable magnet is actuated pneumatically.

\* \* \* \* \*